United States Patent [19]

Yamato

[11] Patent Number: 4,870,774
[45] Date of Patent: Oct. 3, 1989

[54] FISHING ROD

[75] Inventor: Yoshiro Yamato, Sakai, Japan

[73] Assignee: Shimano Industrial Company Limited, Osaka, Japan

[21] Appl. No.: 138,702

[22] Filed: Dec. 28, 1987

[30] Foreign Application Priority Data

Dec. 27, 1986 [JP] Japan .................. 61-199993

[51] Int. Cl.$^4$ ............................................. A01K 87/00
[52] U.S. Cl. ........................................ 43/23; 43/18.1
[58] Field of Search ................ 43/23, 20, 18.1, 18.5

[56] References Cited

U.S. PATENT DOCUMENTS

| | | | |
|---|---|---|---|
| 1,350,635 | 8/1920 | Beaty | 43/23 |
| 2,180,323 | 11/1939 | Maxwell | 43/23 |
| 2,205,769 | 6/1940 | Sweetland | 43/23 |
| 2,535,404 | 12/1950 | Fry | 43/20 |
| 2,577,575 | 12/1951 | Gephart | 43/23 |
| 2,597,738 | 5/1952 | Koos | 43/23 |
| 2,610,427 | 9/1952 | Caroland | 43/18.1 |
| 2,680,923 | 6/1954 | Hyland | 43/18.1 |
| 2,711,047 | 6/1955 | Shepherd | 43/23 |
| 3,229,406 | 1/1966 | Binkley | 43/23 |
| 4,697,377 | 10/1987 | Martin | 43/23 |
| 4,817,324 | 4/1989 | Brackett | 43/23 |

FOREIGN PATENT DOCUMENTS 8706427 11/1987 Sweden ..................... 43/18.1

*Primary Examiner*—Kurt Rowan
*Attorney, Agent, or Firm*—Stevens, Davis, Miller & Mosher

[57] ABSTRACT

A fishing rod is provided which includes a rod body, a reel mounting device mounted at a root portion of the rod body at one radial side thereof, and a flexible grip disposed between reel mounting device and a rod-up portion of the rod. The grip includes surface formed of a harder material than the rest of the grip and having a predetermined width. The finger bearing surface is provided at a surface of the grip positioned at the one radical side of the rod body at which the reel mounting device is mounted.

6 Claims, 1 Drawing Sheet

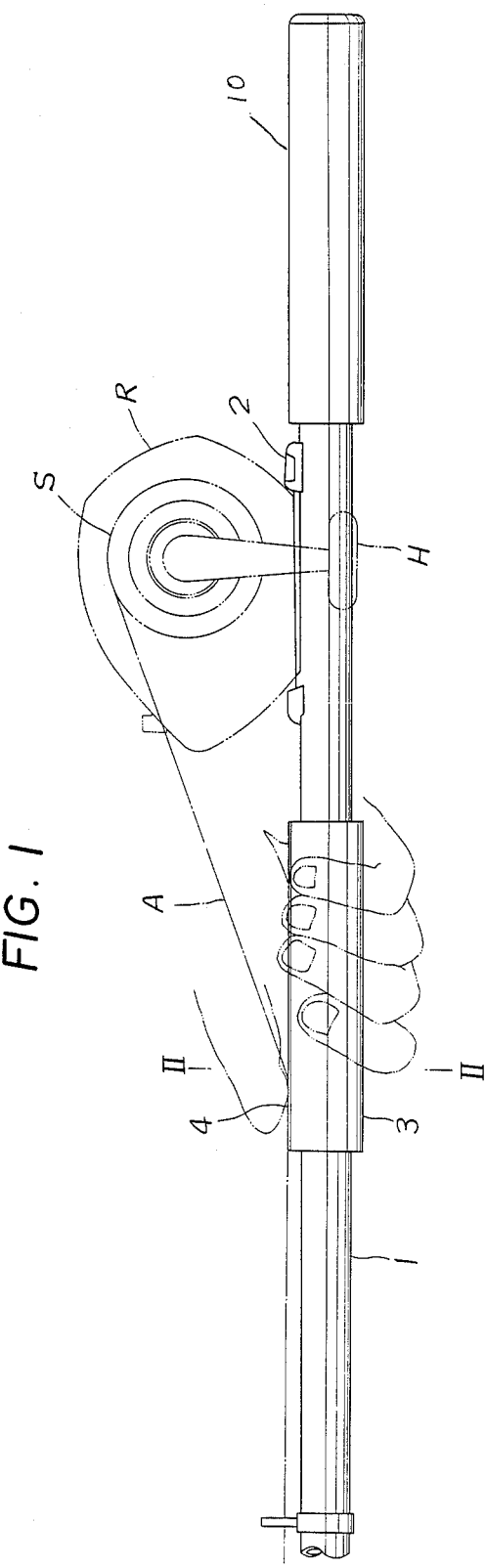
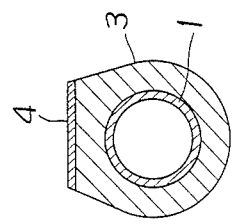
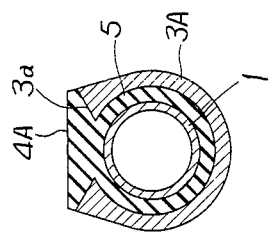
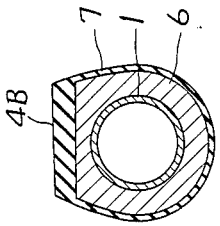

FISHING ROD

FIELD OF THE INVENTION

The invention relates to a fishing rod, and more particularly, to a fishing rod which comprises a rod body, a reel mounting device supported at a root side portion of the rod body at one radial side thereof, and a flexible grip located forwardly of the reel mounting device toward a tip portion of the rod.

BACKGROUND OF THE INVENTION

One type of conventional fishing rod is provided at its rod body with a reel mounting device and a grip, with a plurality of fishing line guides located forwardly of the grip on the rod.

When fishing with this kind of rod, a reel is mounted on the reel mounting device and a fishing line wound onto a spool of the reel is guided to the tip portion of the rod through the line guides and is cast by an angler swinging the rod. When a fish is hooked, the angler grasps the grip located forwardly of the reel mounting device with one of his hands while returning the reel handle with his other hand to wind the fishing line onto the spool. In this manner, the fish is brought in.

When fishing with the conventional type of rod constructed as described above, the angler grasps the grip (located forwardly of the reel mounting device of the rod as described above) and draws up the rod to cause the fish to come to him. If the fish pulls the fishing line strongly to thereby cause the line to be drawn out from the spool, a so-called thumbing procedure is often required to control the drawing-out of the line. Thumbing is done such that the angler puts his finger to the spool onto which the line is being wound, and controls the pressure applied with his finger to brake the rotation of the spool. When the conventional type of rod is used, the angler grasps the grip with one of his hands while gripping the reel handle with his other hand, so that a problem arises in that the angler cannot perform the thumbing operation. As a result, when the line is drawn out from the spool due to a stronger pull of the hooked fish, the fishing line is merely drawn out from the spool without being controlled via braking action, resulting in that the hooked fish is able to escape and hide behind rocks in the sea, i.e., a favorable fishing-up operation of the fish cannot be carried out.

SUMMARY OF THE INVENTION

An object of the invention is to provide a fishing rod wherein the grip provided forwardly of the reel mounting device at the rod is employed especially to enable the angler to control, while comfortably grasping the grip, the drawing out of the fishing line from the spool through press-contacting the drawnout line against the grip using a finger of his hand grasping the grip, thereby facilitating the drawing in of the hooked fish.

The fishing rod of the present invention is constructed such that the rod body is provided at one radial side at the root portion of the rod body with a reel mounting device at which a fishing reel is to be mounted, and there is provided a grip formed of a flexible material grip and positioned forwardly of the reel mounting device. The grip has a predetermined width and is provided at a surface thereof located at the same side of the rod body at which the reel mounting device is mounted with a finger bearing surface portion which is made of a harder material than the material forming the other portions of the grip.

There is no risk of deterioration of an angler's gripping comfort with respect to the grip since the finger bearing surface portion is formed at the flexible grip at its surface which corresponds to the surface of the rod at which the reel mounting device is mounted. In addition, the finger bearing surface has a predetermined width, so that the fishing line drawn out from the spool at the reel mounted on the reel mounting device can be readily press-contacted against the finger bearing surface. Furthermore, the finger bearing portion is hard, so that drawing-out of the fishing line can be effectively controlled, whereby the hooked fish can be easily brought up to the angler.

These and other objects of the invention will become more apparent in the detailed description and examples which follow.

BRIEF DESCRIPTION OF THE DRAWINGS

FIG. 1 is a partial front view showing a first embodiment of the fishing rod of the present invention, FIG. 2 is an enlarged sectional view taken along line. II—II in FIG. 1, FIG. 3 is a sectional view showing a second embodiment and illustrating a view corresponding to FIG. 2, and FIG. 4 is a sectional view showing a third embodiment and illustrating a view corresponding to FIG. 2.

DETAILED DESCRIPTION OF THE PREFERRED EMBODIMENTS

The fishing rod shown in the drawings comprises a rod body 1 and is provided with a reel mounting device 2 which is for the mounting of a fishing reel on the rod and is supported to the rod body 1 on its one radial side at the root side or portion of the rod. A flexible grip 3 is mounted at the rod body 1 to be placed forwardly of the reel mounting device 2. Also, a grip 10 is mounted to the rod body 1 to be placed rearwardly of the reel mounting device 2.

The rod body 1 is formed of a prepreg sheet of parallel or woven high strength fiber permeated with synthetic resin, the sheet being wound around a mandrel, heated under pressure, and molded in a hollow shape. Rod body 1 is formed in a slight conical shape to provide a rod which has no joints at the overall portions form the root side portion to the tip portion of the rod. Alternatively, a plurality of rod sections each having different diameters may be joined to form the rod.

The grip 3 is formed such that a mold made of synthetic resin having a foaming property (such as Ethylene-Vinylacetate Copolymer, etc.) undergoes a cutting operation to be formed in a tubular shape, and the grip is fitted onto the outer periphery of the rod body 1 and fixed thereto by use of fixing means such as adhesive, etc.

In the FIGS. 1, 2 embodiment, a finger-bearing surface 4, which is harder than the remaining portion of the grip 3 and has a predetermined width, is formed at the grip 3 at its surface that is positioned at the aforesaid one radial side of the rod at which reel mounting device 2, and in turn, the reel are mounted.

The finger-bearing surface 4 is made integrally with the grip 3 when the grip is formed from said mold. In other words, the synthetic resin (having a foaming property) when molded is hardened at its surface portion to thereby allow the surface portion to be hard, while the mold has at the remaining (i.e., inner) portion besides the surface portion a foamed layer having flexibility. The hard layer portion at one side surface of this mold is kept remained, and a remnant hard layer portion on the mold is removed to thereby form the grip 3 having flexibility, whereby making the hard layer portion kept at the grip 3 to be the finger-bearing portion 4.

Preferably finger-bearing portion 4 has a size that allows the thumb of the angler's hand gripping the grip 3 to be reasonably easily put on the portion 4.

During fishing, the rod (and the grip) is used such that the angler grasps with one of his hands the grip 3 which is, as described above, located forwardly of the reel mounting device 2, while turning with his other hand a handle H at the fishing reel R mounted at the reel mounting device 2 to wind the fishing line A (being drawn out from the spool S at the reel) onto the spool S, thus taking up a hooked fish. Upon the taking-up of the hooked fish, if the line A is drawn out from the spool S due to a pull force of the fish which is stronger than a drag braking effect set by a drag mechanism at the reel R, the fishing line A can be easily press-contacted against the finger bearing surface 4 by use of the angler's finger of his hand gripping the grip 3. Also, since the finger-bearing surface 4 is hard as aforesaid, the angler can easily and surely apply resistance to the drawing-out of the line A to thereby easily and surely cause the line to be instantly stopped on reduced in speed in the drawing-out, with the result that he is able to fish up the hooked fish easily.

When the reel set at the reel mounting device 2 is a double-bearing type reel as shown in FIG. 1, the fishing line being drawn out from the spool will pass beside the thumb of the angler's hand gripping the grip 3, so that the angler press-contacts the line against the finger-bearing surface 4 by use of a tip portion or a root portion of the thumb of his hand. Alternatively, if the reel is a spinning reel, the fishing line being drawn out from the spool at the reel will pass beside the four fingers (other than the thumb) of his hand gripping the grip 3. Thus, the angler press-contacts the line against the finger bearing surface 4 by use of at least one of the four fingers other than the thumb.

In the above-described embodiment, the finger-bearing surface 4 is made integrally with the grip 3 by use of the hard layer portion at the surface of the mold for the grip 3. Alternatively, as shown in FIG. 3, the grip can be formed with a grip body 3A made of a material having flexibility and a tubular core member 5 made of a hard material (such as synthetic rubber) different from the material forming the grip body 3A, and the tubular core member 5 is provided integrally with a projection having a finger-bearing surface 4A. The grip body 3A is formed in a tubular shape having a slit 3a and is fitted onto the outer periphery of the tubular core member 5, so that the finger-bearing surface portion 4A is exposed outwardly from the slit 3a portion to extend at the surface of the grip body 3A.

Also, in the FIGS. 1, 2 embodiment, the finger-bearing surface 4 is formed integrally with the grip 3 when molded. Alternatively, the finger bearing surface portion can be provided such that the body portion of the grip is first molded by use of the synthetic resin having a foaming property, then, a member having the finger-bearing surface is made by use of synthetic resin (which does not have a foaming property) or a rubber (or its faction) material. Then, this member is overlapped with the grip body portion (made of the synthetic resin having a foaming property) to be joined to the grip body portion, for example, by vulcanization or adhesives. In case of joining by vulcanization, a hard rubber (for example, HS 78–90) may be employed for the finger-bearing portion and joined to the synthetic resin (having a foaming property) upon the synthetic resin's foaming, thus making the hard rubber member integral with the synthetic resin grip body.

In the embodiment shown in FIG. 3, the grip body 3A made of synthetic resin having a foaming property is fitted onto the outer periphery of the tubular member 5 made of hard material such as synthetic rubber. Alternatively, as seen from FIG. 4, on the outer periphery of grip body 6 made of synthetic resin having a foaming property may be fitted an outer covering portion 7 made of a hard material such as synthetic resin (which does not have foaming property) or a rubber (or its faction) material, and having a finger-bearing surface 4B. In this embodiment, the outer covering portion 7 has a smaller thickness over its largest portion, and a portion for the finger-bearing surface 4B is made larger in thickness.

The finger-bearing surface 4, 4A, 4B may be curved while being substantially flat or may have shapes other than being just a flat surface.

The grip 3, 3A may be formed from a material having flexibility such as synthetic rubber, other than the synthetic resin material having a foaming property.

As seen from the above, the rod of the invention is so constructed that the rod body is provided at its one radial side at the root side with a reel mounting device for mounting a fishing reel, and a grip having flexibility is disposed forwardly of the reel mounting device. And, on the surface of the grip which surface is positioned at the rod body's said one radial side for mounting the reel mounting device (and in turn, the reel) is formed the finger-bearing surface harder than the grip and having a predetermined width. Thus, the invention can provide a wonderful gripping feeling for the angler's hand grasping the grip. Also, the fishing line drawn out from the spool at the reel set at the reel mounting device can be surely press-contacted against the finger-bearing surface at the grip by use of his finger of the hand gripping the grip, thereby enabling the angler to easily and surely control the drawingout of the fishing line.

While preferred embodiments of the invention have been described using specific terms, such description is for illustrative purpose only, and it is to be understood that changes and variations may be made without departing from the spirit or scope of the following claims.

What is claimed is:

1. A fishing rod, comprising:
   a rod body having a root portion and a rod-tip portion;
   a reel mounting device mounted at said root portion of said rod body at one radial side thereof; and
   a grip formed of a flexible material and mounted on said rod body between said reel mounting device and said rod-tip portion of said rod body; said grip including a substantially flat finger-bearing surface comprising means for enabling an angler to control the drawing out of a fishing line from a reel mounted on said reel mounting device via at least one finger of his hand gripping said grip by pressing the fishing line against said finger-bearing surface means, said finger-bearing surface means (i) being formed of a harder material than the material of which the rest of said grip is formed, (ii) having a predetermined width, and (iii) being located on a surface of said grip positioned at said one radial said of said rod body at which said reel mounting device is mounted, whereby responsive to said fishing line being pressed by said at least one finger of said angler against said finger-bearing surface means, said fishing line is enabled to form a straight line between a portion thereof pressed by said at least one finger against said finger-bearing surface means and a portion thereof located at said fishing line guide located nearest said grip.

2. Fishing rod according to claim 1, wherein said grip is made of a synthetic resin material having a foaming property and said finger-bearing surface means is formed from a hardened layer formed by hardening of said synthetic resin.

3. A fishing rod according to claim 1, wherein said finger-bearing surface means is formed from a material different from said flexible material of which said grip is formed and is joined to said grip.

4. A fishing rod according to claim 3, wherein said grip comprises a tubular core member made of a hard material and having a projection forming said finger-bearing surface means, said grip further including a grip body made of a flexible material and fitted onto an outer periphery of said tubular core member, said finger-bearing surface means projecting outwardly from said grip body to form said finger-bearing surface means of said grip.

5. A fishing rod according to claim 3, wherein said grip comprises a grip body made of a flexible material and an outer covering portion made of a hard material and comprising a portion having a larger thickness than the other portions of said covering portion, said portion having said larger thickness forming said finger-bearing surface means.

6. A fishing rod according to claim 1 wherein said finger-bearing surface means is a substantially flat surface.

* * * * *